United States Patent [19]
Kessler

[11] Patent Number: 6,023,743
[45] Date of Patent: Feb. 8, 2000

[54] SYSTEM AND METHOD FOR ARBITRATING INTERRUPTS ON A DAISY CHAINED ARCHITECTED BUS

[75] Inventor: Stephen Louis Kessler, Essex Junction, Vt.

[73] Assignee: International Business Machines Corporation, Armonk, N.Y.

[21] Appl. No.: 08/872,590

[22] Filed: Jun. 10, 1997

[51] Int. Cl.[7] .................................................. G06F 13/00
[52] U.S. Cl. .......................................... 710/113; 710/113
[58] Field of Search .................................. 395/280–310, 395/733–744

[56] References Cited

U.S. PATENT DOCUMENTS

| | | | |
|---|---|---|---|
| 4,615,019 | 9/1986 | Bonci | 364/900 |
| 4,631,670 | 12/1986 | Bradley et al. | 364/200 |
| 4,907,149 | 3/1990 | Gula et al. | 364/200 |
| 5,016,162 | 5/1991 | Epstein et al. | 364/200 |
| 5,185,864 | 2/1993 | Bonevento et al. | 395/275 |
| 5,282,272 | 1/1994 | Guy et al. | 395/275 |
| 5,321,818 | 6/1994 | Wendling et al. | 395/325 |
| 5,377,334 | 12/1994 | Boldt et al. | 395/325 |
| 5,423,053 | 6/1995 | Cahen | 395/800 |
| 5,446,910 | 8/1995 | Kennedy et al. | 395/800 |
| 5,515,538 | 5/1996 | Kleiman | 395/733 |
| 5,590,372 | 12/1996 | Dieffenderfer et al. | 395/824 |
| 5,671,446 | 9/1997 | Pakity et al. | 395/874 |
| 5,740,383 | 4/1998 | Nally et al. | 395/296 |

FOREIGN PATENT DOCUMENTS

| | | |
|---|---|---|
| 478487A | 4/1901 | European Pat. Off. . |
| 5-89028 | 4/1909 | Japan . |
| 2225460 | 5/1930 | United Kingdom . |

OTHER PUBLICATIONS

Bederman, S. "Decentralized Interrupt Logic for Multiprocessor Systems Using Relative Addressing of Register Space", *IBM Technical Disclosure Bulletin*, Apr. 1979 pp. 4519–4523.

Schott, K.P. "Control of Time Delay Generation for Elements in a Daisy Chain", *IBM Technical Disclosure Bulletin*, Jul. 1989, pp. 294–297.

Claffey–Cohen, M.E. "Method of Improving Parallel Port Interrupts in Personal Computers", *IBM Technical Disclosure Bulletin*, Jun. 1992, pp. 54–58.

Heath, C.A. "Adaptive Interrupt Sharing", *IBM Technical Disclosure Bulletin*, Apr. 1986, pp. 4808–4811.

*The VMEbus Specification (conforms to IEEE 1014–1987 and IEC 821 & 297).* published by VITA, 10299 Scottsdale Road, Suite B, Scottsdale, AZ 85253-1437.

*Primary Examiner*—Ayaz R. Sheikh
*Assistant Examiner*—David A. Wiley
*Attorney, Agent, or Firm*—Shelley M Beckstrand

[57] ABSTRACT

A method and apparatus is provided for assuring balanced servicing of interrupts among devices at the same interrupt level in a daisy-chain architected bus, such as the VME bus, by detecting that a second device on the same level as a first device is having an interrupt serviced, and responsive thereto raising the interrupt level of the first device.

10 Claims, 7 Drawing Sheets

SYSTEM AND METHOD FOR ARBITRATING INTERRUPTS ON A DAISY CHAINED ARCHITECTED BUS

BACKGROUND OF THE INVENTION

Technical Field of the Invention

This invention pertains to a method and apparatus for servicing interrupts on a daisy-chained bus architecture, such as the VME bus. More particularly, it relates to a method and apparatus for assuring balanced servicing of interrupts from devices on the same interrupt level.

Background Art

In a daisy-chained bus, such as the VME bus, no architected method is provided for insuring that interrupts from two different devices which share the same interrupt level will be serviced in a balanced manner. A device that generates interrupts very frequently will be serviced much more often than another device that is plugged into a higher numbered slot on the bus. Bus protocol is such that it is entirely possible that the other device's interrupt will only be serviced after the device in the lower numbered slot has quiesced. Delaying interrupt service cannot be tolerated in many time critical applications.

The daisy-chained interrupt acknowledge architecture of the VME bus assigns interrupt priority primarily by the level of the interrupt and secondarily by the slot location of the interrupting device. When two devices that share the same interrupt level require interrupt service the device in the lower numbered slot will have its interrupt handled first. The other device's interrupt will be left pending. If the lower numbered device's interrupt again becomes active before the higher numbered device's interrupt was serviced the lower numbered device will again have its interrupt serviced by the interrupt handler. The bus architecture has no protocol to insure that higher numbered devices will not be starved for interrupt service. Thus the occurrence of the problem is dependant upon the interrupt service latency in the interrupt handler and the frequency of interrupts from a lower numbered device.

It is, therefore, an object of the invention to assure balanced servicing of interrupts from devices sharing the same interrupt level in a daisy-chain architected bus.

SUMMARY OF THE INVENTION

In accordance with the invention, a method is provided and an apparatus is provided for assuring balanced servicing of interrupts among devices at the same interrupt level in a daisy-chain architected bus by detecting that a second device on the same level as a first device is having an interrupt serviced, and responsive thereto raising the interrupt level of the first device.

Other features and advantages of this invention will become apparent from the following detailed description of the presently preferred embodiment of the invention, taken in conjunction with the accompanying drawings.

BEST MODE FOR CARRYING OUT THE INVENTION

When a VME bus device goes into an interrupt service pending state architected bus protocol only requires that the device look for its interrupt to be acknowledged, that is, serviced. In accordance with the invention, such a device monitors the interrupt acknowledgement activity on the bus. When the device sees that another device, interrupting at the same level, had its interrupt serviced, this device exits from an interrupt service pending state and immediately enters a missed interrupt state.

Entry into the missed interrupt state causes the device to activate an additional, higher priority interrupt level. The higher priority interrupt will now override the lower numbered device whether or not its interrupt becomes active a second time. When the interrupt handler is ready to service another interrupt it will acknowledge this higher priority interrupt. This technique assures that interrupts from two different devices which share the same priority level will be serviced in a balanced manner.

Figure 1:
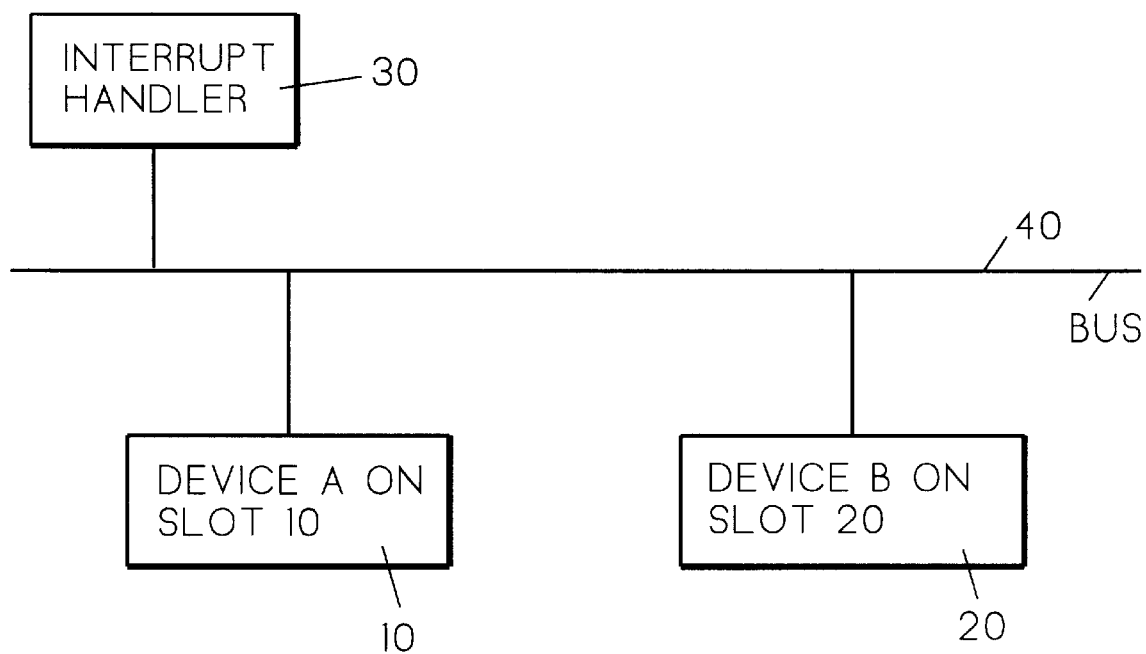
FIG. 1 is a high level flow diagram illustrating the system of the invention.

Referring to FIG. 1, device A and device B are attached to bus 40 at slots 10 and 20, respectively, along with interrupt handler 30. Both device A and device B are assigned to the same interrupt level.

Figure 2A:
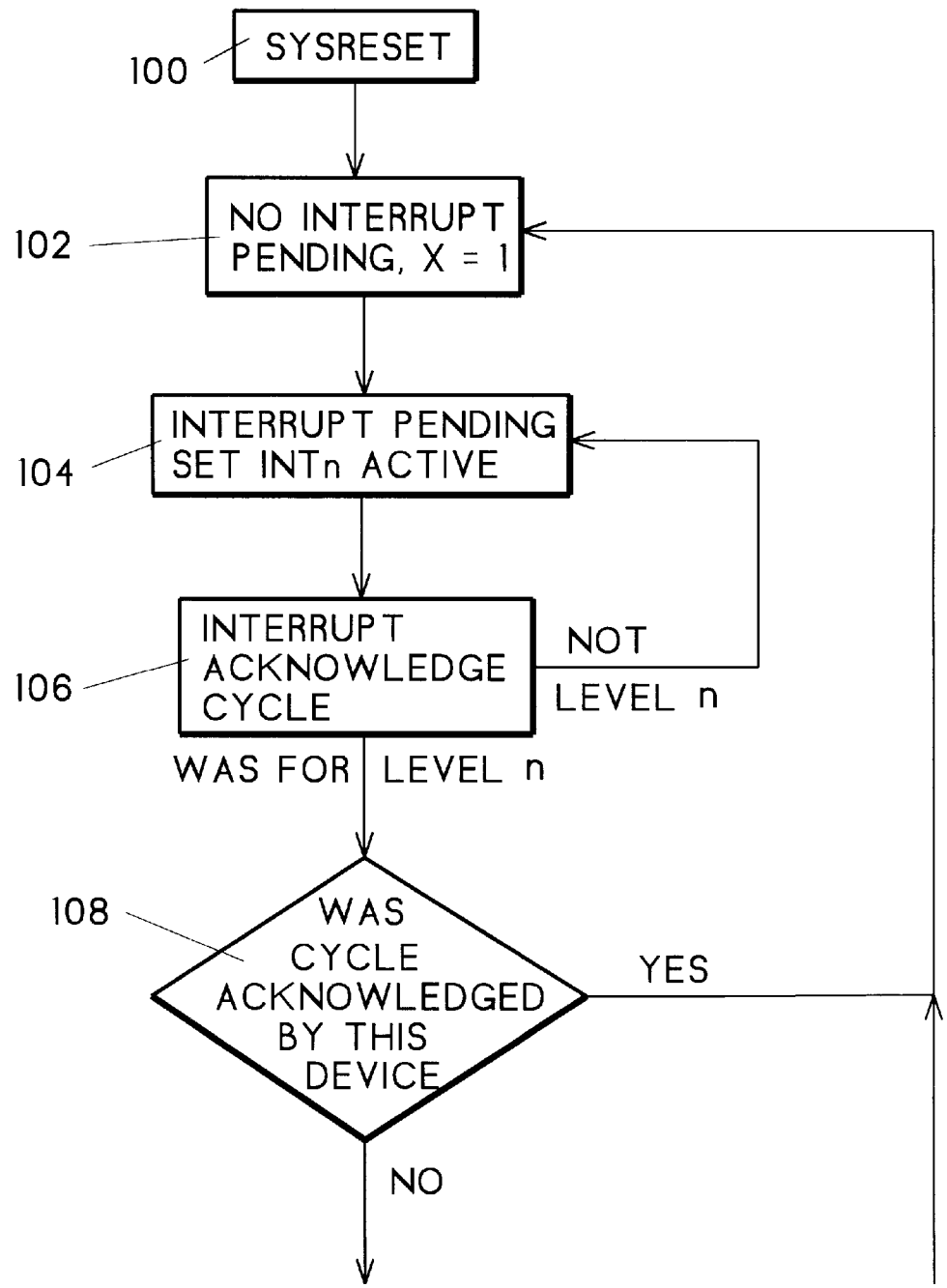
FIG. 2 is a flow diagram illustrating the method steps of the invention.
Figure 2:
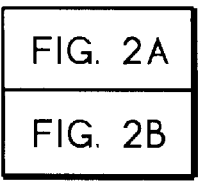
Figure 2B:
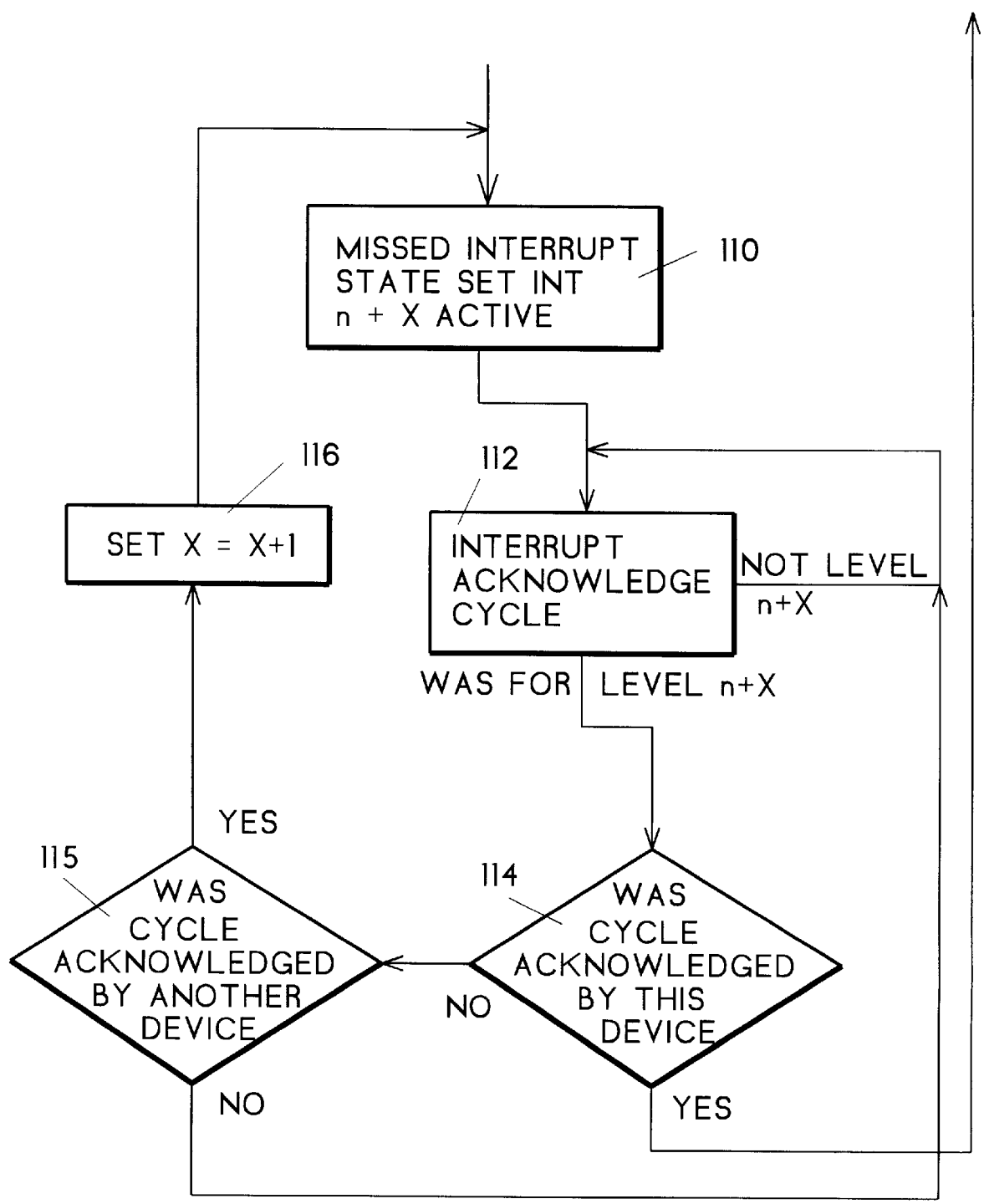

Referring to FIG. 2, the method of the invention is presented. In step 100, system reset occurs, resetting all interrupts and states for all devices 10, 20. Consequently, in step 102 there are no interrupts pending for this device 20. In step 104, this device 20 initiates a pending interrupt at level n, and sets its interrupt level n to active. In step 106, an interrupt acknowledge cycle is executed by interrupt handler 30, and is monitored by device 20 to determine if the interrupt acknowledge cycle was at its interrupt level, n. If not, this device 20 continues monitoring in steps 104, 106 for the next interrupt acknowledge cycle. If device 20 determines that the interrupt acknowledge cycle executed by interrupt handler 30 was for level n, in step 108 this device 20 determines if that cycle was acknowledged by this device 20, or by some other device 10. If this device 20 acknowledged the cycle, processing returns to no interrupt pending state 102. If this device 20 was not the one to acknowledge the cycle, in step 110 this device 20 enters the missed interrupt state and sets interrupt level n+x active. In step 112, this device 20 continues to monitor bus 40 for an interrupt acknowledge cycle executed by interrupt handler 30. Upon detecting that such a cycle occurred at level n+x, and in step 115 that it was acknowledged by some other device 10, in step 110 this device 20 increments its interrupt level to a new n+x (where in step 116 the value of x was increased), and continues monitoring for an interrupt acknowledge cycle. In step 114, upon determining that this device 20 acknowledged an interrupt acknowledge cycle, this device 20 resets its pending interrupt levels and missed interrupt state, and returns to step 102.

Figure 3:
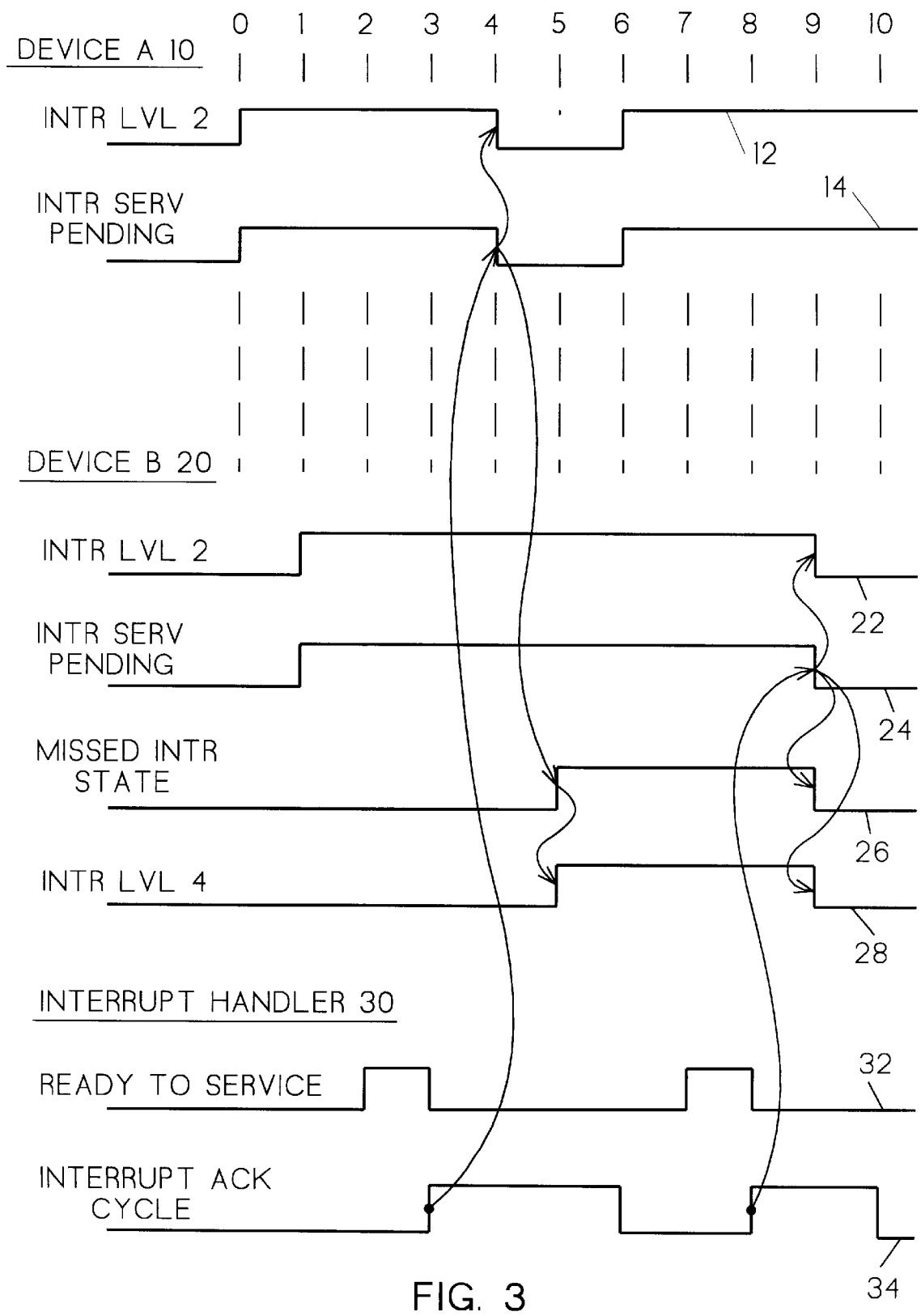
FIG. 3 is a timing chart illustrating the method of the invention.

Referring to FIG. 3, the various states of devices A at slot 10 and B at slot 20 on VME bus 40 are illustrated with respected to passage of time in unitless integers. Both devices A and B use interrupt level 2. At time 0 device A activates an interrupt at level 2, designated by line 12. At time 1, device B activates an interrupt at level 2, designated by line 22. Thus at time 2, both devices A and B are in the interrupt service pending state, designated by lines 14 and 24, respectively. At time 2, interrupt handler 30 becomes ready to service an interrupt, as is designated by line 32. An interrupt acknowledge cycle starts on VME bus 40 at time 3, as is represented by line 34. Because device A is in the earlier slot 10 of all devices A and B having interrupts pending at the same level 2, its interrupt is serviced at time 4. Device B sees this, enters the missed interrupt state as is represented by line 26, and at time 5 activates an additional interrupt at level 4, as is represented by line 28. Thus, at time 5, device A has no interrupt pending (line 12 is inactive), and device B, has two interrupts active, one at level 2 (line 22) and one at level 4 (line 28), and is in the missed interrupt state (line 26 is active.) At time 6 device A enters the interrupt service pending state (line 14 goes active) and activates interrupt level 2 line 12. By time 7 the interrupt handler 30 is ready to service another interrupt. According to VME protocol the highest level interrupt is serviced and an interrupt acknowledge cycle starts at time 8. Device B's interrupt (line 28) is serviced at time 9. By time 10 device B has no interrupt pending (lines 22, 24 and 28 are inactive) and device A has one interrupt active on level 2 (line 12) and is still in the interrupt service pending state (line 14.) Thus, device B, even though in a more remote or higher slot position, has not been blocked out by a pending interrupt at device A, even though devices A and B initially are assigned to the same interrupt level.

Figure 4:
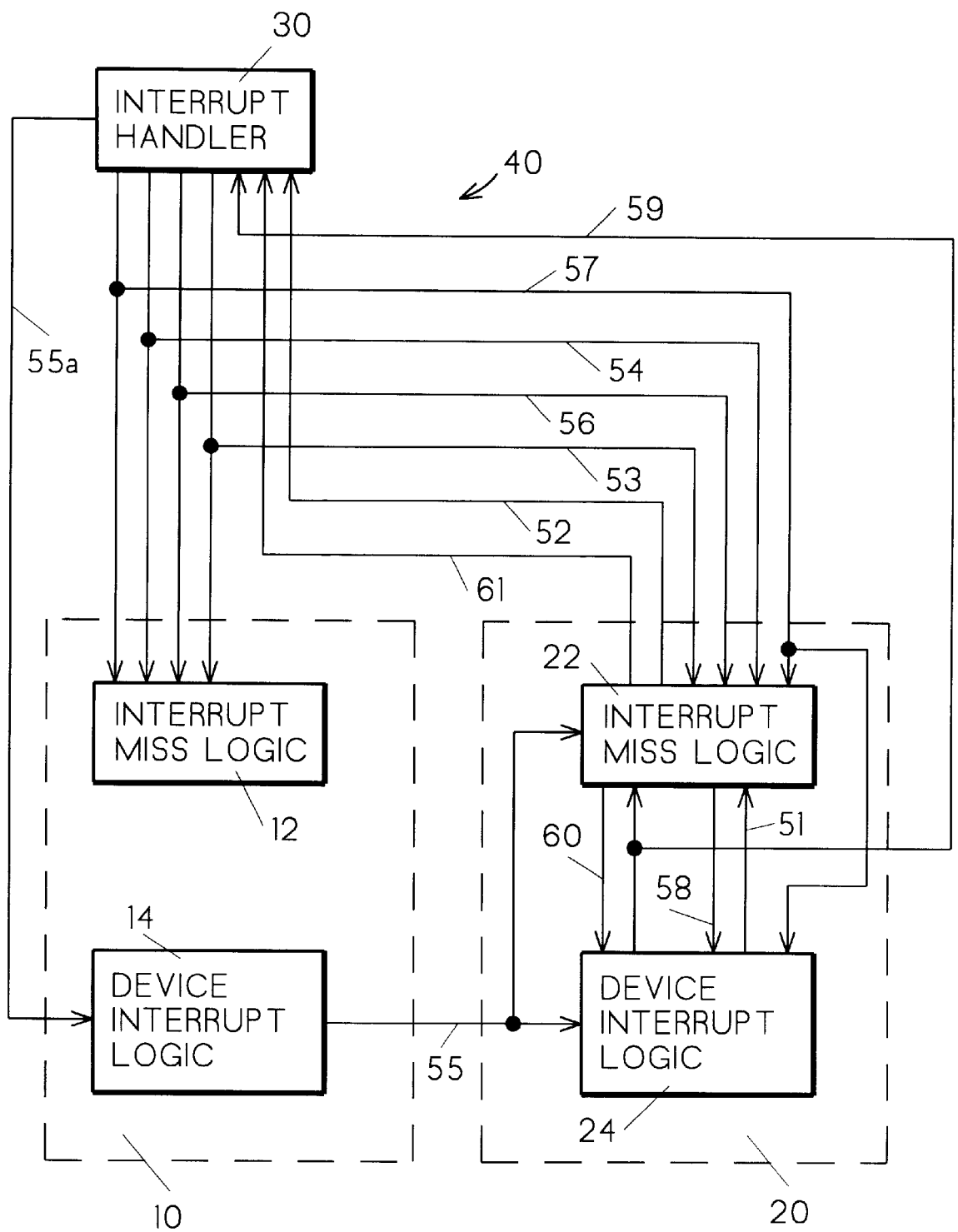
FIG. 4 is a logic flow diagram illustrating a preferred embodiment of the invention.

Referring to FIG. 4, a logic diagram illustrating the interrupt miss logic of the invention, implemented on a VME bus, will be described. In FIG. 4, two devices 10, 20 are shown in connection with each other and with interrupt handler 30. However, there may be many more devices. Also, for simplicity, the interconnecting signal lines for interrupt miss logic circuit 22 and device interrupt logic with each other and over VME bus 40 with interrupt handler 30 are shown in greater detail only for device 20. Similar interconnections will be required for device 10 logic blocks 12 and 14, and other similarly situated devices (not shown) which implement the interrupt miss logic of this preferred embodiment of the invention.

The VME bus is described in "The VMEbus Specification (conforms to IEEE 1014-1987 and IEC 821 & 297)", published by VITA; 10299 Scottsdale Road, Suite B; Scottsdale, Ariz. 85253-1437; the teachings of which are incorporated herein by reference.

Inputs to interrupt handler 30 on VME bus 40 include VME DTACK line 59 from device interrupt logic 24; and VRE IRQ 4 line 61 and VME IRQ 2line 52 from interrupt miss logic 22. The outputs from interrupt handler 30 on VME bus 40 include VME DS0 line 57, VME IACK line 54, VME AS line 56, and VME A01, VME A02, VME A03 octal bus 53; and VME IACKIN line 55a to device 10. VME IACKIN line 55 to device 20 is the daisy chained VME IACKOUT line from device 10. Lines 57, 54, 56 and 53 are fed in parallel to all devices 10, 20 on VME bus 40.

Within device 20, the inputs to device interrupt logic 24 include VME IACKIN 55, MISSED INTR STATE line 60, DECODE LVL 2 line 58, and VME DS0 line 57. The outputs of device interrupt logic 24 include VME DTACK 59 to logic 22 and handler 30, daisy chained VME IACKIN line 55b to handler 30, and INTR SERV PENDING line 51 to logic 22. The operation of logic devices 22 and 24 and will be explained hereafter in connection with FIGS. 5 and 6.

Figure 5:
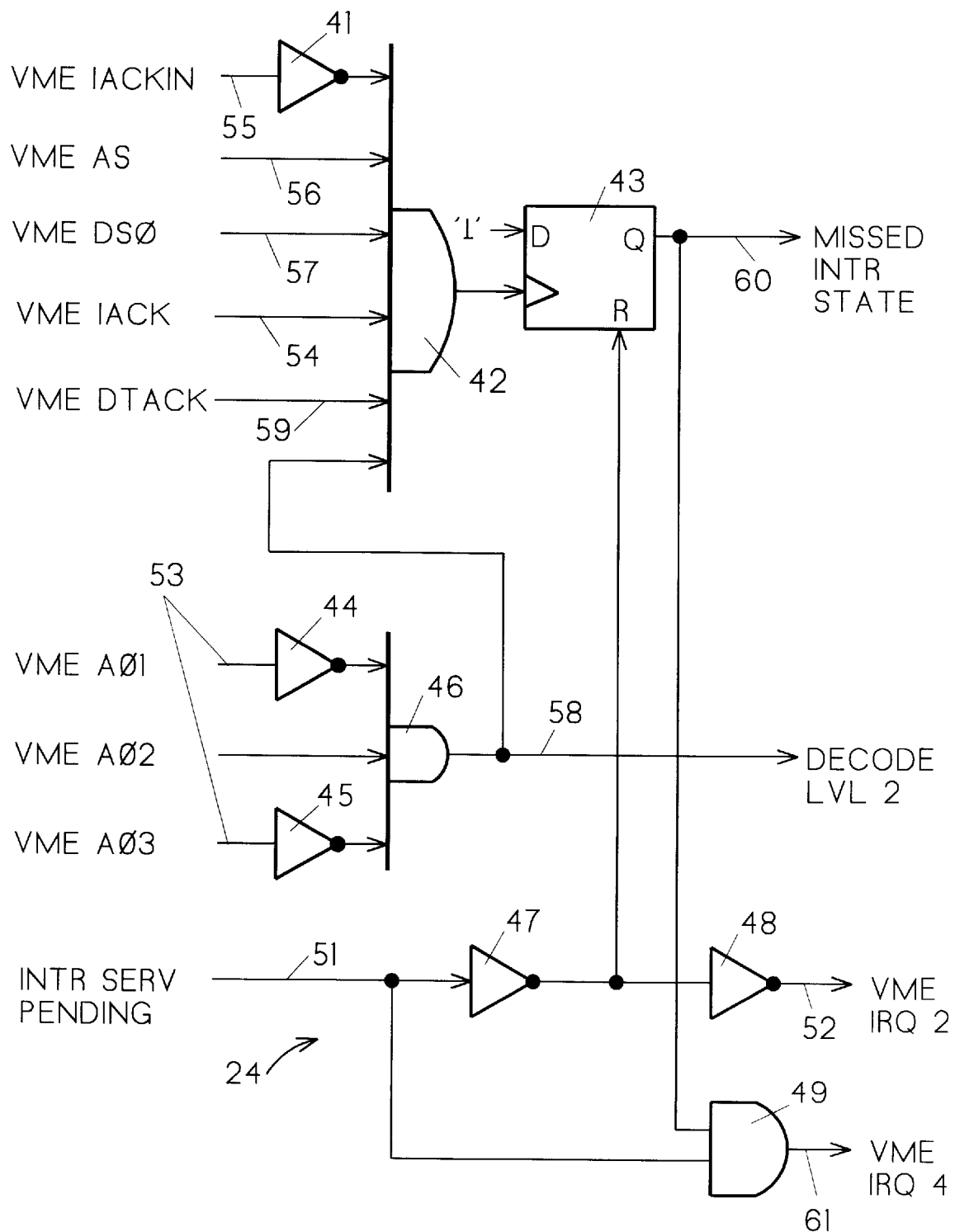
FIG. 5 is a logic flow diagram illustrating in greater detail the interrupt miss logic block 22 of FIG. 4.

Referring to FIG. 5, the interrupt miss logic circuit 22 for implementing a preferred embodiment of the invention on the VME bus includes AND gate 42 feeding the clock input of flip flop 43.

Referring to Table 1, the operation of flip flop 43 is illustrated by a truth table, in which:

| | |
|---|---|
| D | is the data input. |
| > | is the clock input and indicates that the input is sensitive to changes from a logic 0 to a logic 1. |
| R | is the reset input. |
| Q(T + 1) | is the flip-flop output at time T + 1. |
| Q(T − 1) | is the flip-flop output at time T − 1. |
| X | is a don't care value: the value can be either a logic 0 or logic 1. |
| 0 → 1 | is a rising edge: the input changing from a logic 0 to a logic 1 at time T. |
| 1 → 0 | is a falling edge: the input changing from a logic 1 to a logic 0 at time T. |

TABLE 1

D FLIP FLOP 43 TRUTH TABLE

| INPUTS | | | OUTPUT |
|---|---|---|---|
| D | > | R | Q(T + 1) |
| X | X | 1 | 0 |
| X | 0 | 0 | Q(T − 1) |
| X | 1 | 0 | Q(T − 1) |
| X | 1 → 0 | 0 | Q(T − 1) |
| 0 | 0 → 1 | 0 | 0 |
| 1 | 0 → 1 | 0 | 1 |

In the embodiment of FIG. 5, the data input of flip flop 43 is tied to a logical "1".

The inputs to AND gate 42 are VME IACKIN line 55 inverted by inverter 41, VME AS line 56, VME DS0 line 57, VME IACK line 54, VME DTACK line 59 and DECODE LVL 2 line 58. Inverters 44 and 45 are on the inputs to AND gate 46, which has as inputs inverted VME A01, VME A02 and inverted VME A03 lines 53. The three one bit lines VME A01, VME A02 and VME A03 are used by interrupt handler 30 to signal one of seven (octal: OCT 1 through OCT 7) interrupt levels it desires to service. The output of AND gate 46 is DECODE LVL 2 line 58. INTR SERV PENDING line 51 is fed to AND gate 49 and to inverter 47, the output of which is fed to the reset pin of flip flop 43 and inverter 48, the output of which is VME IRQ 2 line 52. INTR SERV PENDING line 51 is also fed to AND gate 49 along with MISSED INTR STATE line 60. The output of AND gate 49 is VME IRQ 4 line 61, which in this example represents the next higher level interrupt (level 4) activated by device 20 when it enters a missed interrupt state (from interrupt level 2.)

Figure 6:
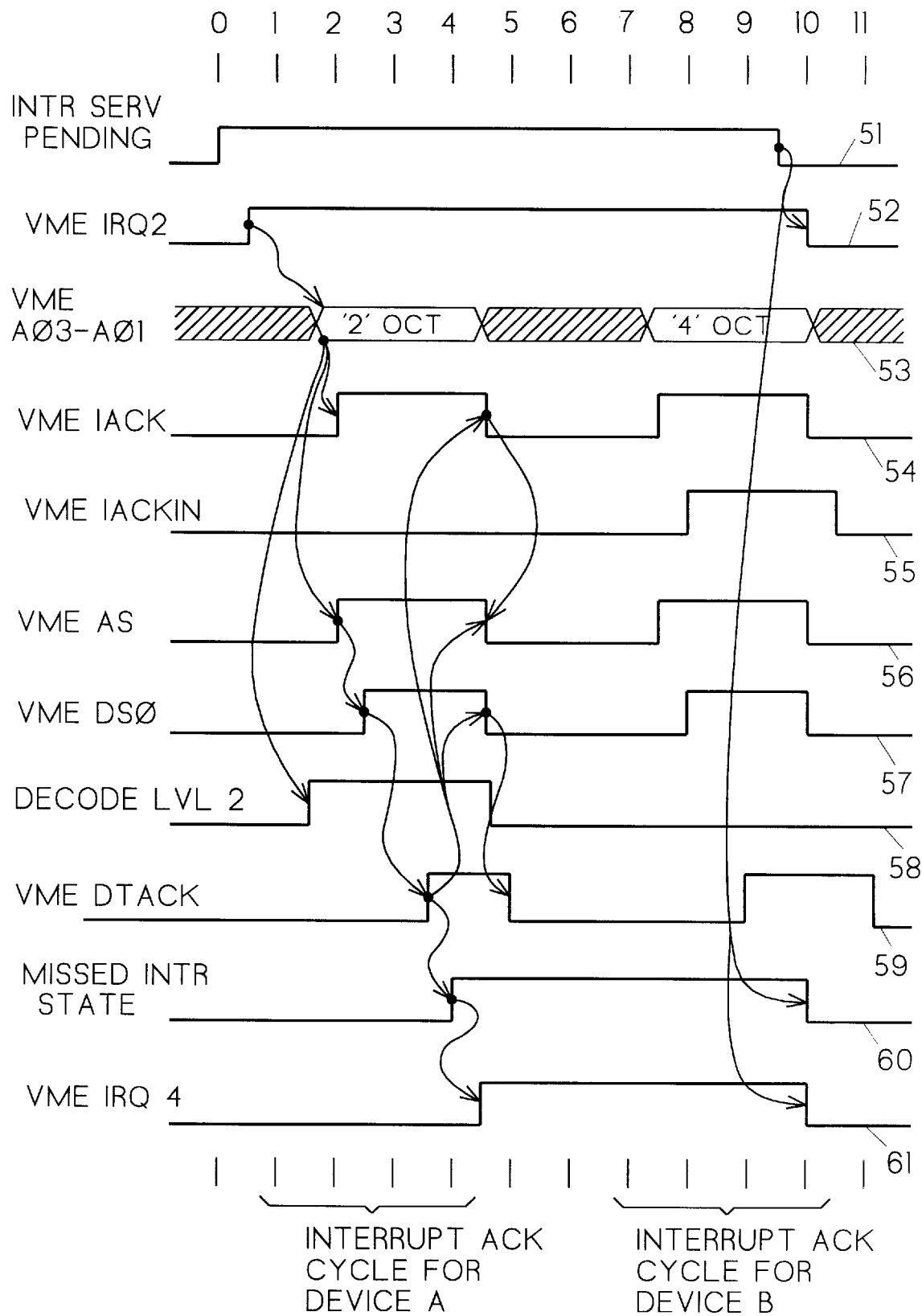
FIG. 6 is a timing chart illustrating the operation of the interrupt miss logic 22 and device interrupt logic 24 shown in FIGS. 4 and 5.

Referring now to FIG. 6 in connection with FIGS. 4 and 5, the VME protocol embodiment of the invention will be described, showing the operation of interrupt miss logic 22 and device interrupt logic 24 insofar as these relate to the handling of interrupt misses at devices 10 and 20. The interrupt monitor for device 10 includes AND gates 42 and 46, and flip flop 43. The interrupt generator for device 10 includes AND gate 49 and flip flop 43.

A condition occurs inside device B 20 which causes it to enter an interrupt pending state and activate INTR SERV PENDING line 51 from device interrupt logic block 24 at time 0, and thereafter at time 0.5 issue an interrupt request on its assigned interrupt level 2 by activating VME IRQ 2 line 52. An active interrupt, VME IRQ 2 line 52 from a device 10, 20 causes interrupt handler 30 to initiate an interrupt acknowledge cycle. The start of this cycle is indicated by handler 30 when it places the interrupt level it wishes to acknowledge on VME A03–A01 lines 53 at time 1, by the activation of VME AS line 56 at time 2, and by the activation of VME IACK line 54 at time 2. Handler 30 indicates that it is ready for the interrupting device to respond by activating VME DS0 line 57 at time 2.5. In this example another device, device A 10 intercepts the acknowledge cycle thus preventing device B 20 from having its interrupt acknowledged.

Device B 20 detects that its interrupt level is being acknowledged when DECODE LVL line 58 goes active. The decode of the interrupt level is performed by circuits 44, 45 and 46. DECODE LVL line 58 is raised by device B 20 to indicate that the interrupt level being carried on lines 53 matches VME IRQ 2. Whenever device B 20 has a pending interrupt, that is INTR SERV PENDING line 51 is active, it is able to enter the missed interrupt state because inverter 47 causes the over riding reset input on D flip-flop 43 to be inactive thus allowing MISSED INTR STATE line 60 to go active if and only if device B 20 detects a missed interrupt. acknowledge.

A missed interrupt acknowledge is detected by circuits 41 and 42. Device A 10 acknowledges the interrupt cycle by activating interrupt acknowledge signal line VME DTACK 59 at time 3.5, and does not propagate the daisy-chained signal VME IACKIN line 55. The combination of an inactive VME IACKIN line 55, active VME AS line 56, active VME DS0 line 57, active VME IACK line 54, active DECODE LVL 2 line 58, active VME DTACK line 59 causes the output of AND gate 42 to go active. The activation of logic circuit 42 by a 0 to 1 transition on its clock input line from AND gate 42, causes the D flip-flop at logic circuit 43 to activate MISSED INTR STATE line 60 at time 4. Once MISSED INTR STATE line 60 is active device B 20 enters the missed interrupt state and activates the higher priority interrupt VME IRQ 4 at time 4.5. Meanwhile interrupt handler 30 detects an active VME DTACK line 59 at time 3.5 and thus knows that the interrupt cycle has been acknowledged by a device 10, 20. Interrupt handler 30 then ends the interrupt acknowledge cycle by deactivating VME IACK line 54, VME AS line 56, VME DS0 line 57, and VME A03–A01 lines 53 at time 4.5. Once device A 10 sees an inactive VME DS0 it deactivates VME DTACK line 59 at time 5.

Some time later interrupt handler 30 determines that it can acknowledge the interrupt which is active on VME IRQ 4 line 61. In this example, this new cycle starts at time 7 when interrupt handler 30 places the interrupt level it wishes to acknowledge on VME A03–A01 lines 53. The interrupt handler 30 also activates VME AS line 56, VME IACF, line 54 and VME DS0 line 57 at times 7.5 and 8. In this example no other device has an active interrupt on level 4 so device B 20 sees the daisy-chained signal VME IACKIN line 55 go active at time 8. Other logic inside device B 20 responds to the interrupt acknowledge cycle by activating the VME DTACK line 59 at time 9 and by deactivating INTR Sin PENDING line 51 at time 9.5. The deactivated INTR SERV PENDING line 51 signal causes VME IRQ 2 line 52 to go inactive by virtue of inverter circuits 47 and 48; cause VME IRQ 4 to go inactive by virtue of AND circuit 49; and causes MISSED INTR STATE line 60 to go inactive by virtue of inverter circuit 47 and flip flop 43. Interrupt handler 30 detects an active VME DTACK line 59 at time 9 and thus knows the interrupt cycle has been acknowledged. Interrupt handler 30 then ends the interrupt acknowledge cycle by deactivating VME IACK line 54, VME AS line 56, VME DS0 line 57, and VME A03–A01 at time 10. Once device B 20 sees an inactive VME DS0 it deactivates VME DTACK line 59 at time 11.

Advantages Over the Prior Art

It is an advantage of the invention that devices operating in earlier slots in a daisy-chain architected interrupt acknowledge bus do not block devices operating in latter slots from having their interrupts acknowledged.

Alternative Embodiments

It will be appreciated that, although specific embodiments of the invention have been described herein for purposes of illustration, various modifications may be made without departing from the spirit and scope of the invention. In particular, it is within the scope of the invention to provide a memory device, such as a transmission medium, magnetic or optical tape or disc, or the like, for storing signals for controlling the operation of a computer according to the method of the invention and/or to structure its components in accordance with the system of the invention.

Accordingly, the scope of protection of this invention is limited only by the following claims and their equivalents.

I claim:

1. A method for operating a first device connected to a computer system having a plurality of devices attached to respective slot locations on a daisy-chained interrupt acknowledge architected bus, with each of said plurality of devices assigned one of a plurality of interrupt levels, said computer system including a central arbitration device for servicing said devices first in order of interrupt level and second in order of slot location, comprising the steps of:

upon entering an interrupt pending state at level N, activating an interrupt pending signal line N;

monitoring said bus for an interrupt acknowledge cycle at level N that is acknowledged by a second device and responsive thereto entering a missed interrupt state; and responsive to entering said missed interrupt state, activating an interrupt pending signal line for an interrupt level of higher priority than N while said interrupt pending signal line N is active.

2. The method of claim 1, comprising the further steps of responsive to acknowledging an interrupt while in a missed interrupt state, restoring said interrupt level to level N.

3. A method for operating a first device connected to a computer system having a plurality of devices attached to respective slot locations on a daisy-chained interrupt acknowledge architected bus including a plurality of discrete priority level signal lines, with each of said plurality of devices assigned one of a plurality of interrupt levels, said computer system including a central artibration unit for servicing said devices first in order of interrupt level and second in order of slot location, comprising the steps of:

initializing a first variable to a base value;

entering an interrupt pending state at a first interrupt level by activating a first priority level signal line;

while at said first interrupt level, monitoring said bus for an interrupt acknowledge cycle at said first interrupt level;

responsive to an interrupt acknowledge cycle at said first interrupt level, determining whether said interrupt acknowledge cycle was acknowledged by another device, and if so entering a missed interrupt state, said missed interrupt state being entered by activating a second priority level signal line corresponding to a second interrupt level equal to the sum of said predetermined level and said first variable.

4. The method of claim 3, comprising the further steps of while in said missed interrupt state at said second interrupt level, monitoring said bus for a second interrupt acknowledge cycle at said second interrupt level;

responsive to a second interrupt acknowledge cycle at said second interrupt level, determining if said second interrupt acknowledge cycle was acknowledged by another device, and if so incrementing said first variable and entering an interrupt level equal to the sum of said first interrupt level and the incremented first variable.

5. The method of claim 4, comprising the further step, responsive to said second interrupt acknowledge cycle being acknowledged by said first device of resetting said first variable and entering a not interrupt pending state.

6. In a computer system including a plurality of devices attached to respective slot locations on a daisy-chained interrupt acknowledge architected bus, each device assigned one of a plurality of interrupt levels, said computer including a centralized arbitration unit for servicing said devices first in order of interrupt level and second in order of slot location, the improvement comprising:

an interrupt monitor in each said device for detecting when another device interrupting at the same level as said device has its interrupt serviced and thereupon placing said device in a missed interrupt state; and an interrupt generator in each said device responsive to entering an interrupt pending state for activating a first interrupt level signal line and responsive to said device being placed in said missed interrupt state for activating an additional, higher priority interrupt level signal line.

7. An interrupt interface for a first device connected to a computer system having a plurality of devices attached to respective slot locations on a daisy-chained interrupt acknowledge architected bus, with each of said plurality of devices assigned one of a plurality of interrupt levels, said computer system including a centralized arbitration unit for servicing said devices first in order of interrupt level and second in order of slot location, the interrupt interface comprising:

an interrupt monitor for detecting when another device interrupting at the same interrupt level as said first device has its interrupt serviced and thereupon placing said first device in a missed interrupt state; and an interrupt generator responsive to entering an interrupt pending state for activating a first interrupt level signal line and responsive to said first device being placed in said missed interrupt state for activating an additional, higher priority interrupt level signal line;

thereby preventing blocking out of said first device by other devices in lower slot locations assigned to said same interrupt level.

8. The interrupt interface of claim 7, further comprising means responsive to entering said missed interrupt state for blocking transmission of a daisy-chained interrupt signal along said bus.

9. The interrupt interface of claim 7 wherein said interrupt monitor comprises a flip flop circuit for generating said missed interrupt state, said flip flop being held reset by the absence of a interrupt service pending indicia and set upon detecting that another device has acknowledged an interrupt cycle at the same interrupt level as said first device.

10. The interrupt interface of claim 9 wherein said interrupt generator comprises an AND gate responsive to the presence of said interrupt service pending indicia and said missed interrupt state for activating said higher priority interrupt level.

* * * * *